United States Patent [19]
Gordon et al.

[11] Patent Number: 5,130,631
[45] Date of Patent: Jul. 14, 1992

[54] ROBOT BUS ARCHITECTURE WITH DISTRIBUTED ELECTRONICS

[75] Inventors: Gary B. Gordon, Saratoga; Carl A. Myerholtz, Cupertino, both of Calif.

[73] Assignee: Hewlett-Packard Company, Palo Alto, Calif.

[21] Appl. No.: 560,505

[22] Filed: Jul. 20, 1990

Related U.S. Application Data

[63] Continuation of Ser. No. 319,606, Mar. 6, 1989, abandoned.

[51] Int. Cl.$^5$ .............................................. G05B 19/42
[52] U.S. Cl. ........................... 318/568.11; 318/568.2; 318/567; 318/565; 318/573; 901/15; 901/20; 395/1
[58] Field of Search ............... 318/560-640; 364/513, 474, 29; 901/3, 7, 8, 9, 12, 13, 15-25; 174/70 B, 71 B, 72 B, 88 B, 99 B; 414/730-735

[56] References Cited

U.S. PATENT DOCUMENTS

| | | | |
|---|---|---|---|
| 3,531,758 | 9/1970 | Blumkin | 174/99 B |
| 3,546,367 | 12/1970 | Hart | 174/99 B |
| 3,606,162 | 9/1971 | Lehmann | 901/50 X |
| 3,718,816 | 2/1973 | Seelbach et al. | 174/99 B X |
| 4,201,937 | 5/1980 | Irie | 318/573 X |
| 4,245,874 | 1/1981 | Bishop | 174/70 B X |
| 4,308,584 | 12/1981 | Arai | 901/15 X |
| 4,420,812 | 12/1983 | Ito et al. | 364/513 |
| 4,467,436 | 8/1984 | Chance et al. | 364/513 |
| 4,546,443 | 10/1985 | Oguchi et al. | 318/568.18 X |
| 4,594,671 | 6/1986 | Sugimoto et al. | 318/568.18 X |
| 4,595,989 | 6/1986 | Yasukawa et al. | 318/568 X |
| 4,602,345 | 7/1986 | Yokoyama | 364/513 |
| 4,604,561 | 8/1986 | Kamajima et al. | 318/567 |
| 4,617,502 | 10/1986 | Sakaue et al. | 364/513 X |
| 4,631,689 | 12/1986 | Arimura et al. | 318/568.2 X |
| 4,633,414 | 12/1986 | Yabe et al. | 364/513 |
| 4,672,279 | 6/1987 | Hasokawa et al. | 901/15 X |
| 4,689,756 | 8/1987 | Koyama et al. | 901/20 X |
| 4,698,777 | 10/1987 | Toyoda et al. | 364/474.29 X |
| 4,706,001 | 11/1987 | Nakashima et al. | 318/565 X |
| 4,804,897 | 2/1989 | Gordon et al. | 364/513 X |
| 4,815,006 | 3/1989 | Anderson et al. | 901/9 X |
| 4,887,222 | 12/1989 | Miyake et al. | 901/2 X |
| 4,906,907 | 3/1990 | Tsuchihashi et al. | 901/15 |
| 4,954,762 | 9/1990 | Miyake et al. | 364/513 |

*Primary Examiner*—Paul Ip

[57] ABSTRACT

In a multi-jointed robot, position controllers are located at each of the joints of the robot and are interconnected by a unitary bus. The bus carries a loosely-regulated voltage to all of the controllers and also includes data conductors connected to the controllers for disseminating position commands which are time-division multiplexed.

20 Claims, 5 Drawing Sheets

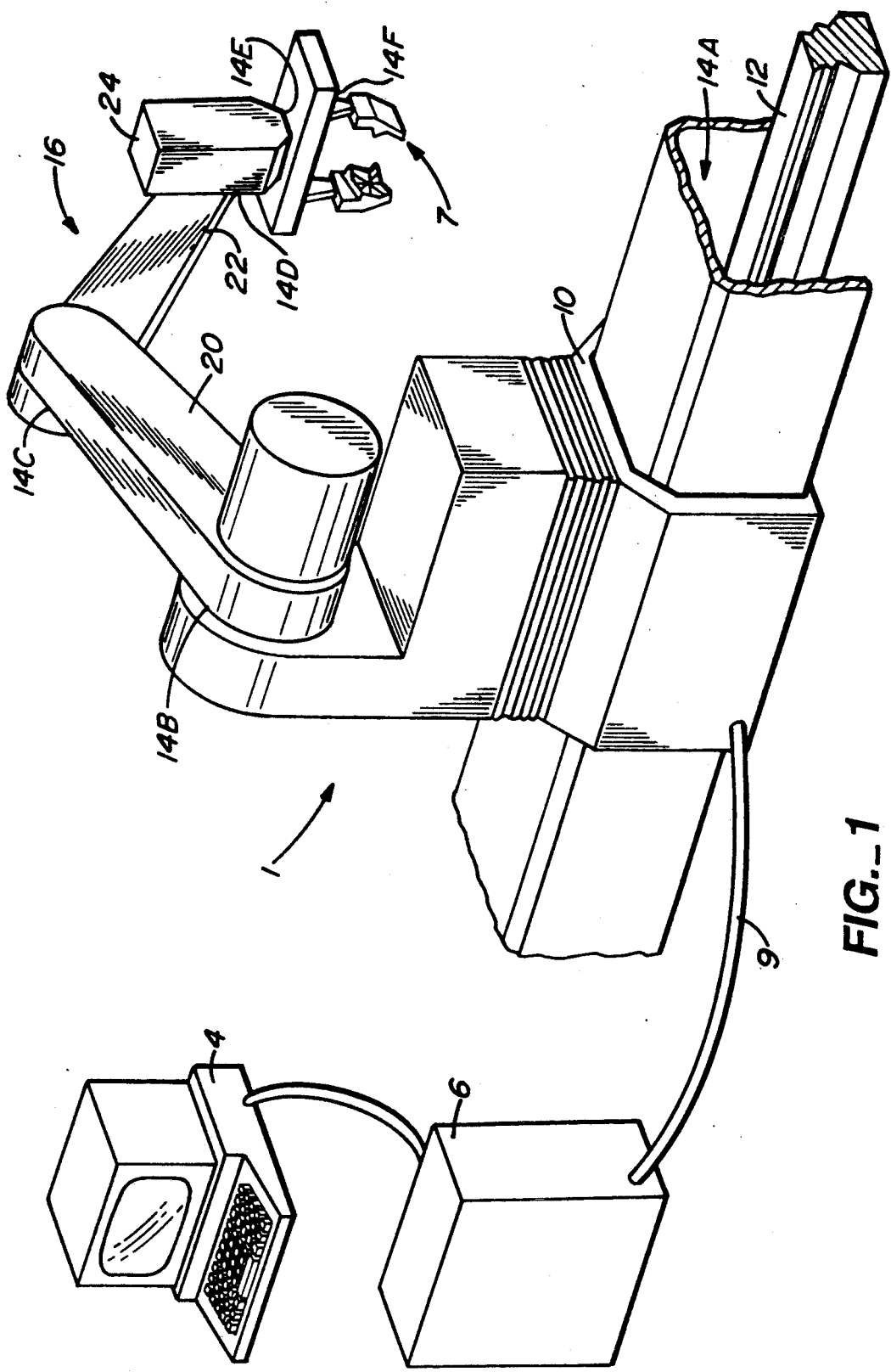
FIG._1

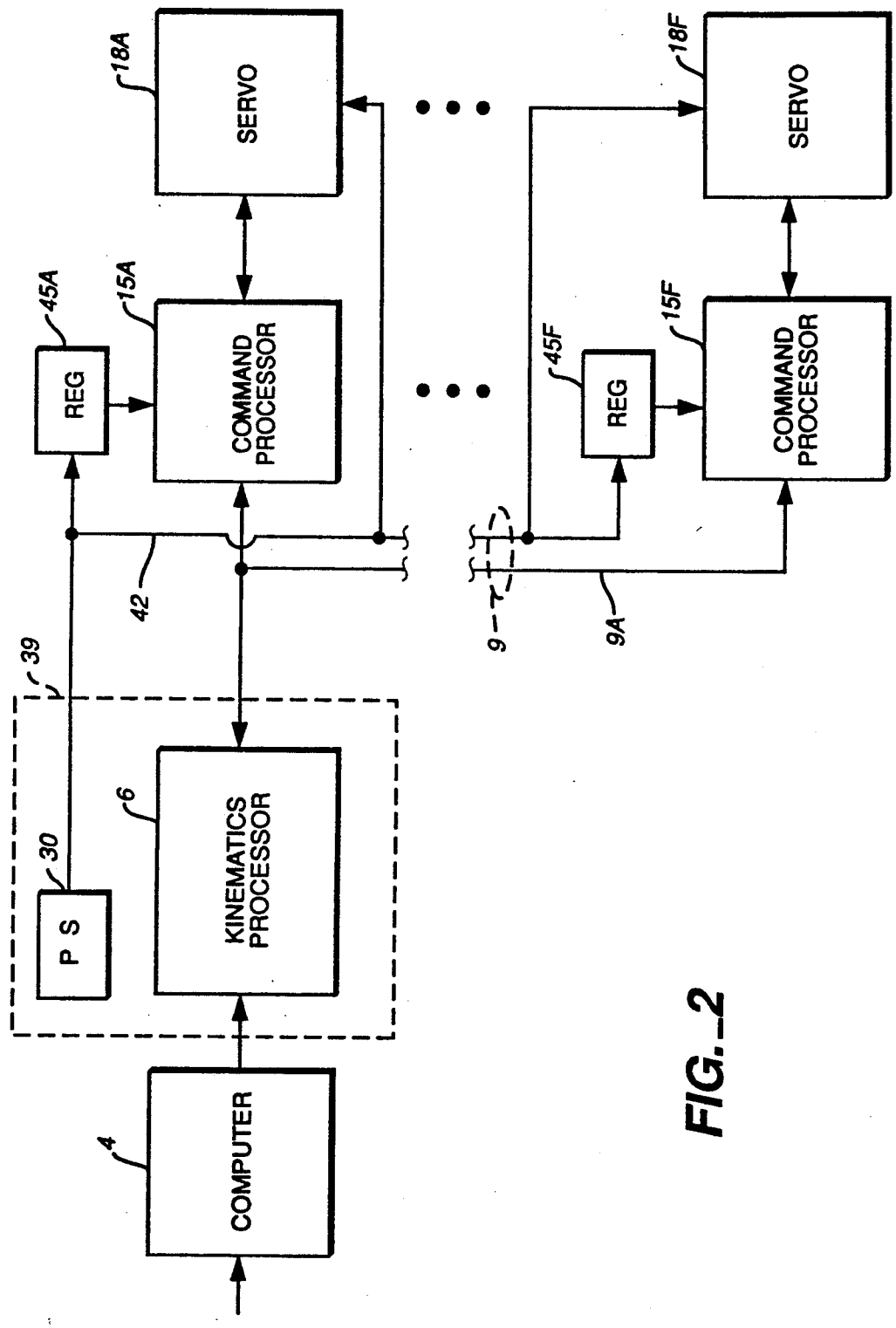
FIG._2

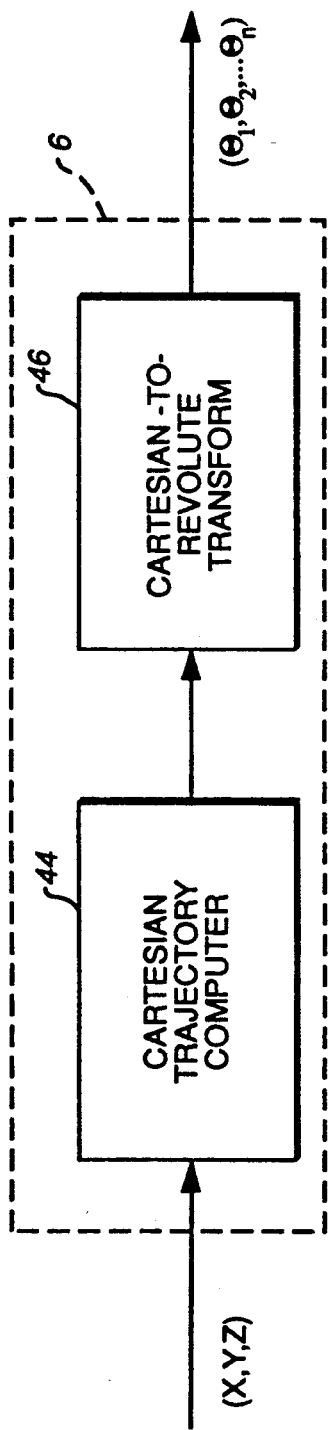
FIG._3
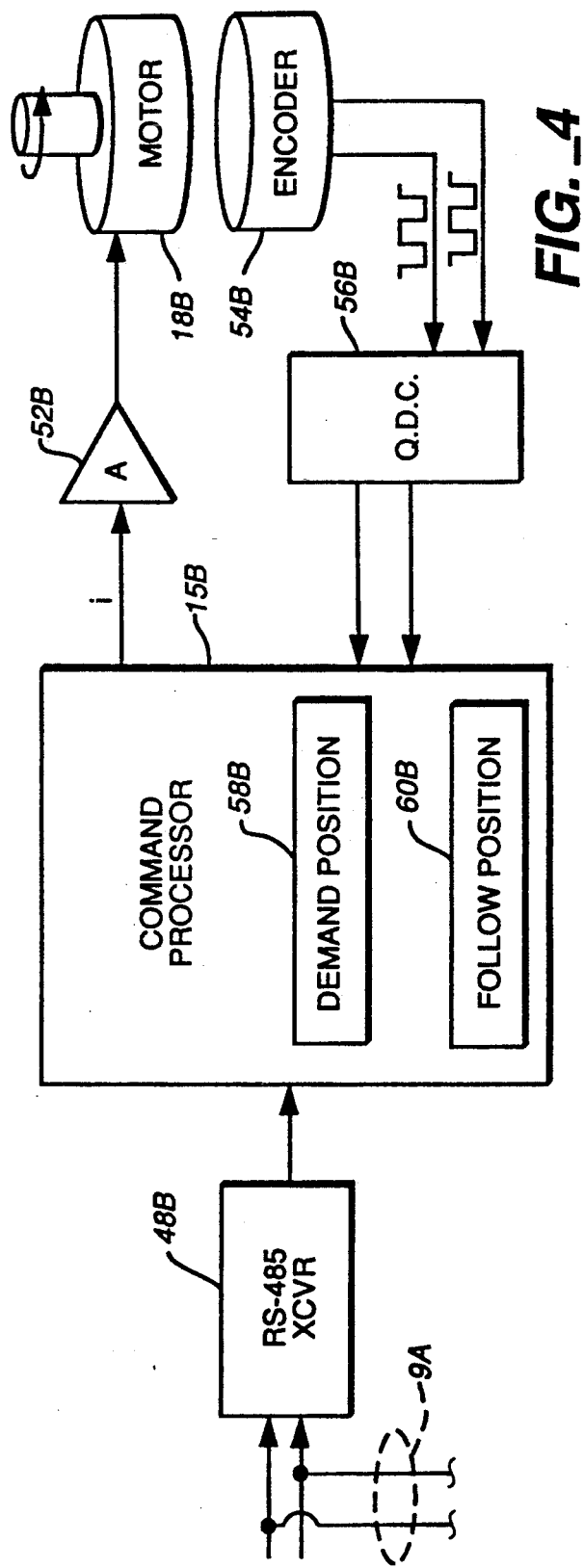
FIG._4

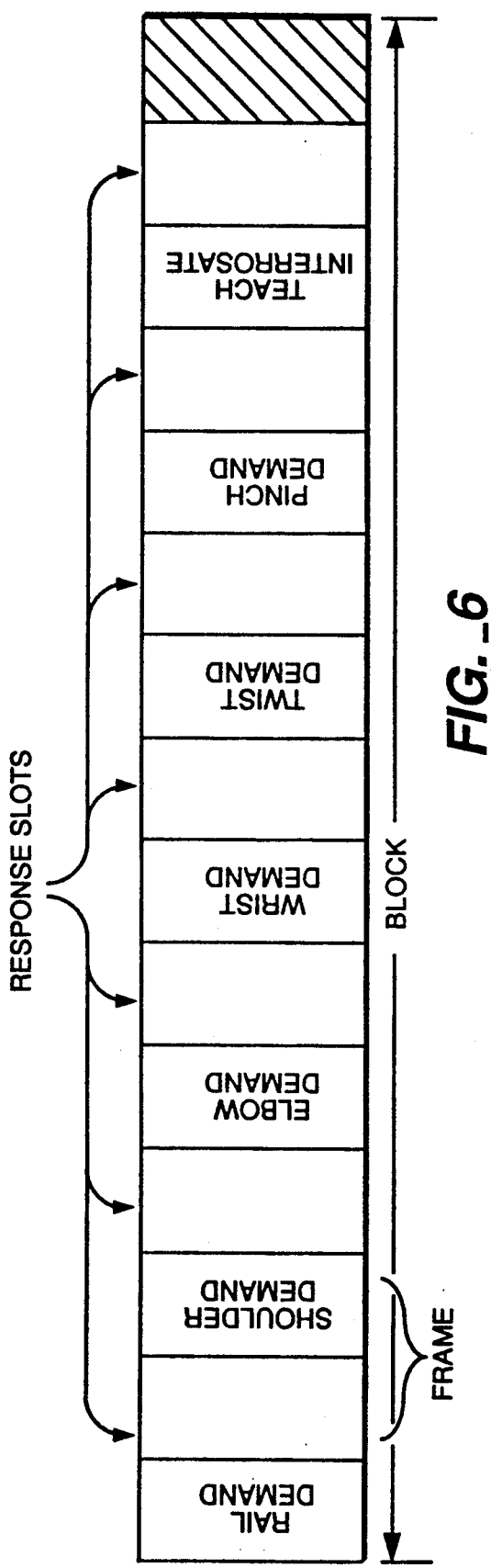
FIG._6
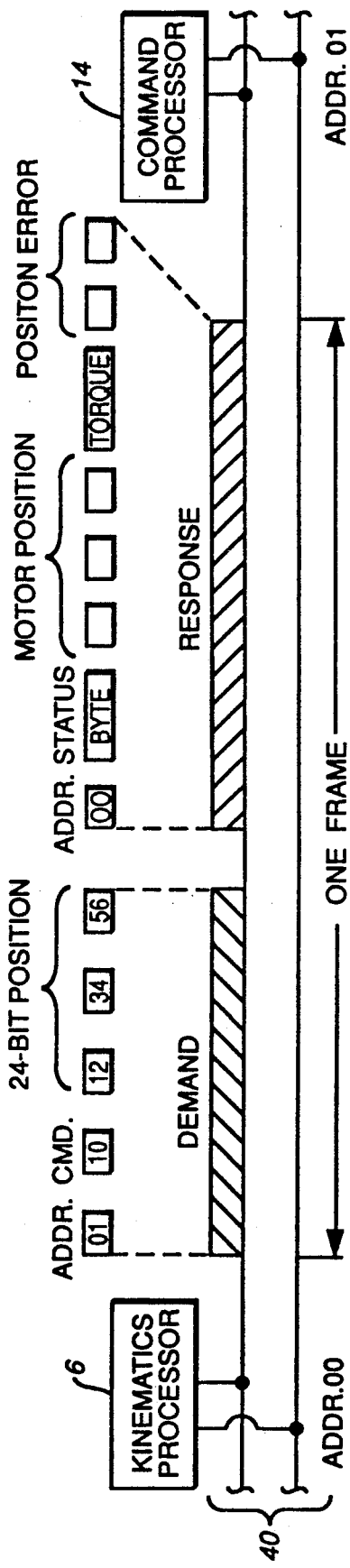
FIG._7

ROBOT BUS ARCHITECTURE WITH DISTRIBUTED ELECTRONICS

CROSS REFERENCE TO RELATED APPLICATION

This application is a continuation of application Ser. No. 07/319,606, filed Mar. 6, 1989, now abandoned.

BACKGROUND OF THE INVENTION

1. Field of the Invention

The present invention relates to systems and methods for controlling robotic motion.

2. State of the Art

In industrial settings, robots generally each have a movable hand, or "end effector", connected to a base via a plurality of movable joints. Normally, a servo motor is located at or near each joint in such robots to allow the end effector to manipulate parts and tools in a controlled manner. For such robots to perform complex and varied tasks in manufacturing operations, it is necessary for the robots each to have several degrees of freedom. It is also highly desirable that multi-jointed robots have coordinated motion even though each joint motor is controlled individually.

In conventional robot architectures, microprocessors and other circuits that control robot joint motors are normally all placed in a single card cage and, typically, six to fourteen control wires are required for interconnection to each robotic joint. Thus, to control a robot with six or more joints, as many as forty or more electrical conductors must be snaked through the limbs and joints of the robot. Such conventional architecture is not only costly in terms of manufacturing, but can decrease robotic reliability while increasing maintenance costs. Accordingly, there is a need to alleviate the complexity of known interconnection architectures for multi-jointed robots.

SUMMARY OF THE INVENTION

According to the present invention, control circuits of a robot are distributed throughout the robot and are interconnected in parallel by a unitary bus structure. In one specific embodiment, the unitary bus structure includes four conductors, two of which are power conductors and two of which are data conductors. Preferably, the data conductors are common to all of the control circuits and bi-directional data communications are carried out by time-division multiplexing. The unitary bus structure reduces manufacturing time and expense, increases reliability, and reduces maintenance cost.

BRIEF DESCRIPTION OF THE DRAWINGS

The present invention can be further understood by reference to the following description and attached drawings which illustrate the preferred embodiment. In the drawings:

FIG. 1 is a pictorial view of one embodiment of a robot including a system for controlling the individual joints of the robot;

FIG. 2 is a functional block diagram of the control system of the robot of FIG. 1;

FIG. 3 is a functional block diagram of the kinematics processor of FIG. 2;

FIG. 4 is a block diagram showing, in greater detail, the command processor and servo mechanism of FIG. 2;

FIG. 6 is a schematic illustration showing time-multiplexing of a data frame over the bus shown in the prior drawings; and FIG. 7 is a schematic representation of a typical transaction in which a data frame is communicated over the bus of the prior drawings.

DETAILED DESCRIPTION OF THE PREFERRED EMBODIMENT

Figure 5:
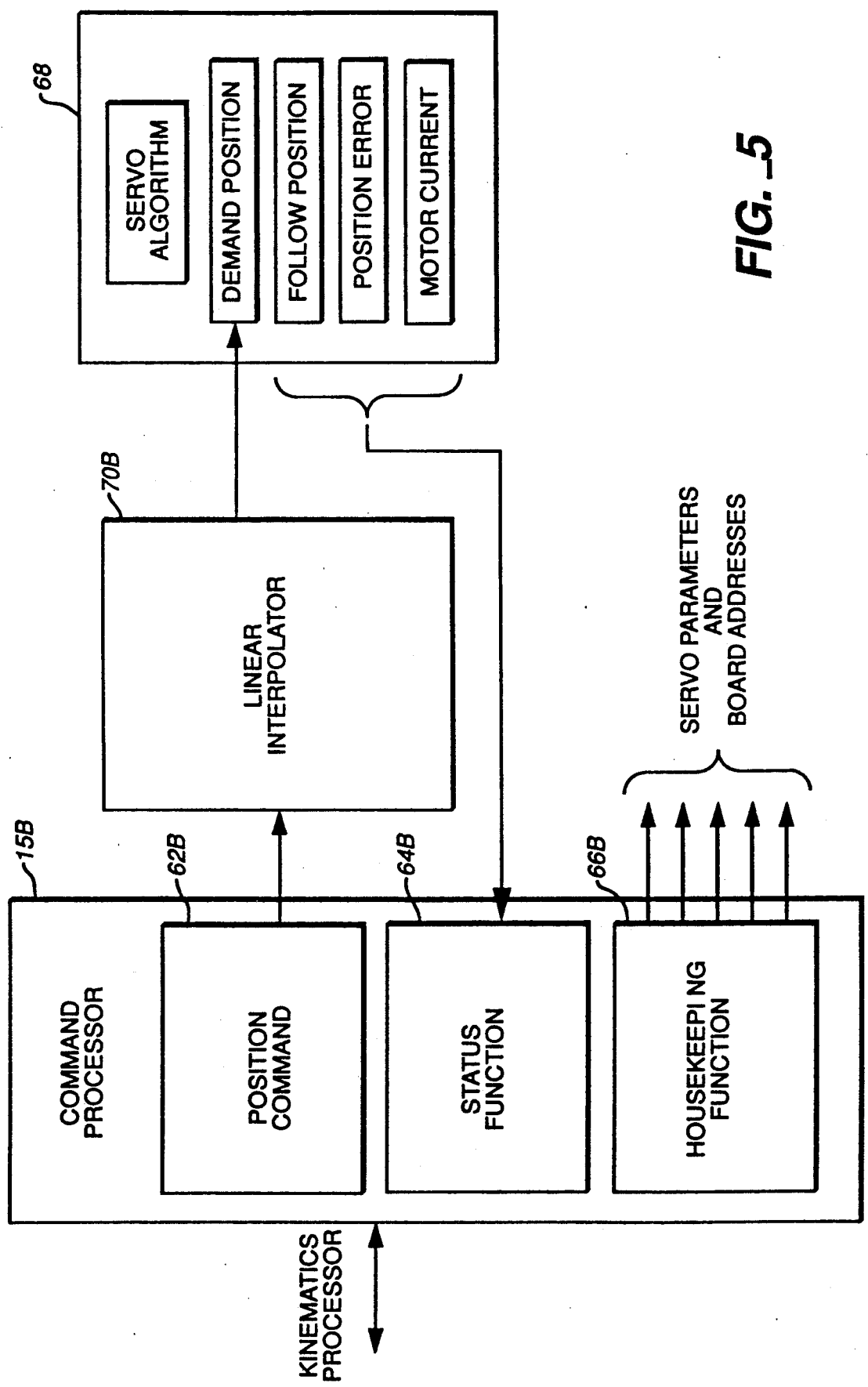
FIG. 5 is a block diagram of the software organization of the command processor.

FIG. 1 shows a multi-jointed robot 1 which is connected for control by a programmable computer 4 and a kinematics processor 6. Together, computer 4 and kinematics processor 6 direct coordinated motion by the robot including its end effector 7. As will be described in detail below, kinematics processor 6 is connected to robot 1 by a unitary power and data bus 9 that provides communication with a plurality of the joint processors in the robot, resulting in an intelligent network.

For purposes of illustration, robot 1 in FIG. 1 is shown as being of the articulated type having a base 10 which is mounted to a carrier member 12 which allows horizontal translatory motion of the robot via a linear joint 14A (hidden from view in FIG. 1). Further, robot 1 includes a rotary shoulder joint 14B to which is connected an arm 16 comprised of an upper arm 20, forearm 22 and wrist 24. The upper arm 20 and forearm 22 are connected by a rotary elbow joint 14C. The forearm 22 and wrist 24 are connected by a rotary wrist joint 14D. At the end of the arm 16, a rotary twist joint 14E connects wrist 24 to end effector 7. In the preferred embodiment, end effector 7 is a gripper having two opposing members connected by a pincer joint 14F to provide pincer-like movement.

In operation of robot 1 of FIG. 1, the motion of joints 14A-14F are controlled by kinematics processor 6 in conjunction with computer 4. The computer 4 can be, for example, a personal computer system such as the Hewlett-Packard Vectra series which is connected to kinematics processor 6 via a standard HPIB bus. In typical practice, computer 4 is programmed to allow an operator to direct high-level operations of robot 1, and kinematics processor 6 is programmed to provide coordinated motion control for each of the joints of the robot based upon commands from computer 4. As will be described below, the joints 14A-14F of robot 1 are each controlled by a separate servo mechanism inclusive of a command processor, a dc servo motor, and a position sensor to detect the position of the joint.

In the system shown in FIG. 2, kinematics processor 6 is connected to provide commands to microprocessor-based command processors 15A-15F at frequent and regular intervals. It should be understood that command processors 15A-15F are located at, or near, the respective joints 14A-14F of the robot of FIG. 1. The command processors 15A-15F are connected to individually control servos 18A-18F which drive the respective joints 14A-14F. In practice, each command processor includes a single-chip microprocessor, such as a Hitachi Model 6301, provided with on-board RAM and ROM, and a timer and a serial interface. In some instances, two or more of the joint servo motors 18A-18F may be controlled by a single microprocessor located central to the joints.

Further with regard to FIG. 2, it should be noted that the command processors 15A-15F share the single bus 9 which, in the preferred embodiment, includes a bidirectional data bus 9A so that kinematics processor 6 can receive feedback signals from the command processors In practice, bus 9 is looped through each of the command processor boards and, at each board, data are tapped off the bus. The data bus 9A preferably comprises a bi-directional differential pair of twisted-wire data conductors which operate according to the RS485 standard for balanced digital multipoint systems with the data communications being time-division multiplexed. Instead of a twisted pair of wires, data bus 9A would comprise an optical fiber to provide the bi-directional communication with a moderate increase in complexity and expense.

As shown in FIG. 3, kinematics processor 6 may be regarded as two separate modules, namely, a cartesian trajectory computation module 44 and a cartesian-to-revolute transform module 46. The two modules 44 and 46 can be embodied as a microprocessor such as one of the Motorola MC68000 family. In operation, cartesian trajectory module 44 computes a sequence of coordinate points in cartesian (x,y,z) space for any specified straight line motion of a robot's joints within the operating envelope of the robot. The sequences of coordinate points are often referred to as linear motion profiles. In practice, each motion profile calculated for a joint typically involves having the kinematics processor 6 demand increasing velocity increments at the outset of a motion, constant velocity increments at peak speed, and decreasing velocity increments as the final position is neared. The cartesian-to-revolute transform module 46 transforms the linear motion profiles into revolute coordinates, or "joint space" coordinates, using spherical trigonometric functions.

Operation of the systems of FIGS. 2 and 3 will now be generally described. Initially, computer 4 provides high-level commands to kinematics processor 6 designating the type of motion desired of the robot. For example, high-level commands could comprise a series of straight-line moves which would result in the robot removing a test tube from a rack and then pouring the contents of the test tube into a beaker. The kinematics processor 6, via its cartesian trajectory computer 44, translates the high-level commands into linear motion profiles to enable each of the joints to implement the commanded action. Then, the cartesian-to-revolute transform module 46 transforms the linear motion profiles into revolute joint space coordinates. In practice, individual sets of the revolute joint space coordinates are computed by module 46 about every forty milliseconds and each set of coordinate points defines a position which is intermediate between an initial and final coordinate location. Then, the sets of revolute coordinates are communicated to command processors 15A–15F via data and power bus 9.

In practice, achievement of smooth motion of a robot which is controlled by a kinematics processor as described above requires decomposition, or interpolation, of the revolute joint space coordinates by time increments smaller than the aforementioned forty millisecond intervals. According to the system of FIG. 2, linear interpolation of the sets of revolute coordinates is performed by the individual command processors 15A–15F. Thus, the output of each of the command processors 15A–15F on data bus 9A comprises a sequence of finely-spaced revolute coordinates which are evenly distributed between each of the intermediate coordinates provided by the cartesian-to-revolute transform module 46.

In practice, the rate at which instructions for a particular joint are sent from the computer 4 to the kinematics processor 6 is about once per second, the rate at which instructions for a particular joint are sent from kinematics processor 6 to a particular command processor is about ten to one hundred times per second, and the rate at which interpolated instructions are actually received by a motor at a particular joint is about one thousand times per second.

As further shown in FIG. 2, the servo motors 18A–18F and the command processors 15A–15F are connected to a power supply 30 via a power bus 42 and switching regulators 45A–45F, respectively. In practice, the power supply 30 is commonly housed with kinematics processor 6 as indicated by the dashed rectangle labelled with the number 39 in FIG. 2. Also in practice, the power on bus 42 is loosely regulated to thirty-two volts (nominal) with a capacity of up to six amperes. At each of the command processors 15A–15F, the voltage is decreased and regulated by the associated one of the switching regulators 45A–45F. The servo motors 18A–18F, however, can be powered directly from power bus 42 without further regulation. It should be recognized that data bus 9A and the power bus 42 together form the unitary bus 9. It should also be appreciated that the power and data channels can be combined by modulating data onto the power bus.

Reference is now made to FIG. 4 which shows a typical one of the command processors, such as processor 15B. FIG. 4 also shows a RS485 transceiver chip 48 for providing a serial data interface with command processor 15B on data bus 9A. In practice, the RS485 transceiver chip provides a uniformly compatible physical interconnection layer for communication between the command processor and kinematics processor 6 of FIGS. 2 and 3. The RS485 transceiver chip also provides substantial immunity to noise by differentially comparing the voltages on the pair of wires comprising data bus 9A.

As also shown in FIG. 4, command processor 15B is connected to control joint motor 18B via a current amplifier 52B. In practice, the control methodology can either be by pulse-width modulation or by digital-to-analog conversion. As still further shown in FIG. 4, an incremental encoder 54B is connected to motor 18B and to a quadrature decoder 56B to provide closed-loop control of the motor. Preferably, incremental encoder 54B is the type comprised of a rotating disc divided into alternating light and dark segments with two photocells which are phase shifted by ninety degrees. Such an incremental encoder is preferred because it allows a quadrature decoder to detect both the relative magnitude and direction of changes in position of a motor armature. Incremental encoders and quadrature decoders are commercially available from, for example, the Hewlett-Packard Company.

In operation of the system of FIG. 4, command processor 15B receives demand positions on data bus 9A and receives follow positions from quadrature decoder 56B. The demand and follow positions are stored in dedicated registers 58B and 60B, respectively, which are integral to command processor 15B. Based upon the stored demand and follow positions, command processor 15B operates to calculate the difference between pairs of positions. These calculations provide position errors, in real time, for the associated joint. The command processor 15B then uses the computed position errors to determine the magnitude of the current to motor 18B according to a control algorithm such as the control law that the velocity of the joint should be proportional to position error. In the preferred control strategy for a static demand position, command processor 15B operates such that the control loop between control processor 14B and motor 18B is traversed iteratively until the position error zero. Thus, the overall control of motor 18B can be understood in terms of three nested control loops, the innermost being the current control loop, the next being the velocity control loop, and the outermost being the position control loop.

Command processor 15B can be further understood by reference to the block diagram of software organization shown in FIG. 5. As shown in FIG. 5, command processor 15B comprises three modules: a position command module 62B, a status function module 64B, and a "housekeeping" function module 66B. The position command module 62B is connected to a linear interpolator 70B which, as mentioned above, performs linear interpolations of joint coordinate positions with respect to the demand positions. The interpolations can comprise, for instance, 32-steps between each position command.

FIG. 5 further shows a servo module 68 comprising a servo algorithm and several registers including a demand position register and a follow position register. According to information stored in those registers, status function module 64B provides return information to kinematics processor 6 (FIGS. 1 and 2) in response to the position commands received by command processor 15B. Typically, the return information includes the status of the motor position and motor current. The motor current status is indicative of motor torque and, hence, indicates whether the limb of the robot has encountered an obstacle.

The housekeeping function module 66B in FIG. 5 is provided to connect command processor 15B with conventional components of the command processor board. For instance, module 66 allows reading and writing to storage registers containing servo parameters and board addresses. Also, it should be understood that module 66 provides functions including reset and initialization.

FIG. 6 shows one example of a synchronous protocol for time slot allocation on data bus 9A. In the preferred method of operation, time slots are allotted on data bus 9A to allow kinematics processor 6 to issue position commands to command processors 15A-15F and to allow each of the command processors to return joint angle and position error messages to the kinematics processor. According to the illustrated allocation system, one demand time slot is allotted to each command processor 15A-15F to allow it to receive position demand information (i.e., the coordinates of target positions). Also in the illustrated protocol, each demand slot is followed by a response slot which is allocated to the demanded joint processor to allow it to send responsive signals to the kinematics processor 6. In practice, a demand slot and a response slot for each command processor on the bus are together referred to as a data frame.

FIG. 7 is also provided to assist in explaining the transactions data on bus 9A. A typical bus transaction includes, as in the example shown, a 24-bit position command and a sequence of status responses. In actual practice with, for example, a robot having six joints and a single kinematics processor, the seven devices on the bus are each assigned a unique address Then, each message on data bus 9A is denoted by a header byte that includes a device address and contains one idle byte and up to eight data bytes. As shown in the example in FIG. 7, a typical position command includes the address of the commanded device, the command code, and a three-byte demand position. As also shown in the example in FIG. 7, a typical response includes the address of the responding device, a status byte, a three-byte indication of motor position, a torque byte, and a two-byte indication of position error. For maximum length messages, a frame may involve twenty bytes of data. In practice, it is preferred that the bytes are transmitted in serial order, with one start bit and one stop bit, for a total of ten bits. This practice results in a maximum of two hundred bits per bus transaction and about 1400 bits per data block. Typically the kinematics processor 6 handles twenty-five data blocks per second, resulting in an overall data rate of about thirty-five kilobits per second.

It will be appreciated by those of ordinary skill in the art that the present invention can be embodied in other specific forms without departing from the spirit or essential character of the invention. Accordingly, the presently disclosed embodiments should be considered in all respects to be illustrative and not restrictive. Further it should be understood that the scope of the invention is indicated by the appended claims rather than the foregoing description. All changes which come within the meaning and range of equivalents thereof are intended to be embraced within those claims.

What is claimed is:

1. In a multi-joint robot having at least two joints dispersed away from a central location, apparatus for controlling the motion of the robotic arm comprising:
   kinematics processor means disposed in the central location for providing joint-positioning demand signal frames;
   joint driving means, each disposed for positioning a proximal joint;
   distributed joint-control processing means, each disposed proximal to a joint for controlling at least one associated joint driving means, and each operative to produce a command signal;
   wherein the associated joint driving means responds to the command signal to position the proximal joint; and
   bus means extending from the central location and throughout said robotic arm for interconnecting in parallel the kinematics processor means and the joint-control processing means and for transmitting the demand signal frames to the joint-control processing means;
   wherein each joint-control processing means responds to one of the demand signal frames, to produce the command signal.

2. The apparatus of claim 1 further comprising electrical power supply means for providing power; and said bus means delivers power to the joint driving means and the joint-control processing means.

3. The apparatus of claim 2 wherein the bus means comprises two power conductors and at least one data conductor.

4. The apparatus of claim 3 wherein the kinematics processor means transmits the joint-positioning demand signal frames as time-division multiplexed signals to said joint-control processing means on the data conductor of the bus means.

5. The apparatus of claim 4 wherein each of said joint-control processing means operates linearly to interpolate position information from said kinematics processor means.

6. The apparatus of claim 1 wherein said bus means comprises a predetermined number of conductors which is independent of the total number of joint-control processing means.

7. The apparatus of claim 1, wherein each of said joint-control processing means operates linearly to interpolate position information from said kinematics processor means.

8. The apparatus of claim 1 further including means to time-division multiplex the joint-positioning demand signal frames on the bus means.

9. The apparatus of claim 1, wherein said bus means comprises a predetermined number of conductors which is independent of the total number of joints.

10. The apparatus of claim 1, wherein said bus means comprises a predetermined number of conductors which is independent of the total number of joint driving means.

11. The apparatus of claim 1 wherein said bus means is bi-directional and said kinematics processor means is operative to receive information produced by the joint-control processing means and transmitted by the bus means.

12. An apparatus as in claim 1 being so constructed and arranged that each demand signal frame is associated with a corresponding one of the joint-control processing means.

13. The apparatus as recited in claim 12 being so constructed and arranged that the demand signal frames are transmitted as a stream of data, each demand signal frame has a slot in the stream, and each slot is associated with a corresponding one of the joint-control processing means so that the demand signal frame in that slot is received by the corresponding one of the joint-control processing means for producing the command signal.

14. The apparatus of claim 12 being so constructed and arranged that each of the joint-control processing means is designated with an address, each demand signal frame includes address data, and the one of the joint-control processing means designated with the address contained in the address data responds to the demand signal frame for producing the command signal.

15. The apparatus of claim 1 wherein each of the joint-control processing means includes a microprocessor.

16. A method of controlling a robotic arm having at least two joints using a circuit interconnection architecture of reduced complexity, comprising the steps of:
locating a kinematics processor at a central area;
operating the kinematics processor to produce a joint-positioning demand signal;
providing joint driving means and disposing each for positioning a proximal joint;
providing joint-control processing means and disposing each proximal to one of the joints for controlling at least one associated joint driving means;
operating the joint-control processing means to respond to the demand signal for producing a command signal;
operating the associated joint driving means to respond to the command signal for positioning the proximal joint;
providing a singular bus structure throughout the robotic arm for transmitting the joint-positioning demand signal between the kinematics processor and the joint-control processing means.

17. The method as recited in claim 16 further including the steps of:
providing data frames in the joint-positioning demand signal;
associating each data frame with a corresponding one of the joint-control processing means so that the kinematic processor means is operative to communicate individually with each of the joint-control processing means.

18. The method as recited in claim 17 further including the steps of:
associating an address code to each of the joint-control processing means;
inserting in each data frame the address code of the associated joint-control processing means to be activated by the kinematics processor; and
operating each one of the joint-control processing means so that it responds to the data frame having the address code of that one joint-control processing means for controlling the associated joint driving means.

19. The method of claim 16 further comprising the steps of coupling an electrical power supply means to the bus means; and transmitting power from the power supply means via the bus means to joint driving means and the joint-control processing means.

20. The method of claim 16 further comprising the step of providing in the bus means a predetermined number of conductors which is independent of the total number of joints.

* * * * *